(12) United States Patent
Kurasawa

(10) Patent No.: US 7,639,335 B2
(45) Date of Patent: Dec. 29, 2009

(54) ELECTRO-OPTICAL DEVICE AND ELECTRONIC APPARATUS

(75) Inventor: Munenori Kurasawa, Chino (JP)

(73) Assignee: Epson Imaging Devices Corporation, Azumino-shi (JP)

( * ) Notice: Subject to any disclaimer, the term of this patent is extended or adjusted under 35 U.S.C. 154(b) by 145 days.

(21) Appl. No.: 12/043,653

(22) Filed: Mar. 6, 2008

(65) Prior Publication Data
US 2008/0231789 A1    Sep. 25, 2008

(30) Foreign Application Priority Data
Mar. 19, 2007 (JP) ............................. 2007-070209
Feb. 21, 2008 (JP) ............................. 2008-039743

(51) Int. Cl.
*G02F 1/1343* (2006.01)
(52) U.S. Cl. .................... 349/139; 349/56; 349/122; 349/140; 349/147
(58) Field of Classification Search ............... 349/139, 349/56, 41, 42, 47, 122, 140, 141, 142, 143, 349/147, 150, 158, 187
See application file for complete search history.

(56) References Cited

U.S. PATENT DOCUMENTS 5,694,189 A * 12/1997 Nakamura et al. .......... 349/143
6,136,444 A * 10/2000 Kon et al. ................. 428/423.1
6,507,337 B1* 1/2003 Sato et al. .................... 345/173
6,888,606 B2* 5/2005 Hinata et al. ................. 349/149
7,165,874 B2* 1/2007 Nagakubo et al. ........... 362/623
2002/0163614 A1* 11/2002 Hinata et al. ................. 349/139
2008/0231789 A1* 9/2008 Kurasawa ................... 349/139

FOREIGN PATENT DOCUMENTS

| JP | 03-167522 A | 7/1991 | ............ 349/139 X |
| JP | 2001-242439 A | 9/2001 | |
| JP | 2002023186 A | 1/2002 | ............ 349/139 X |
| JP | 2002-250926 A | 9/2002 | |
| JP | 2005-317760 A | 11/2005 | |

* cited by examiner

*Primary Examiner*—Brian M Healy
(74) *Attorney, Agent, or Firm*—Lowe Hauptman Ham & Berner LLP

(57) ABSTRACT

An electro-optical device includes an electro-optical panel including a first substrate and a second substrate which interpose an electro-optical material therebetween, a transparent conductive film disposed on an outer surface of the first substrate or the second substrate, and a base member having an electrode electrically connected to the transparent conductive film via an adhesive, in which the electrode is formed at a region having a plane shape, which is the same as or narrower than that of the base member, the base member is provided with concave portions or through-holes disposed along a side thereof, and the concave portions or the through-holes are provided with the adhesive.

8 Claims, 11 Drawing Sheets

ELECTRO-OPTICAL DEVICE AND ELECTRONIC APPARATUS

BACKGROUND

1. Technical Field

The present invention relates to an electro-optical device used in an electronic apparatus such as a personal computer and a cellular phone.

2. Related Art

As display devices of electronic apparatuses such as a personal computer and a cellular phone, electro-optical devices, for example liquid crystal devices have been used. The liquid crystal device includes a liquid crystal panel in which liquid crystals are sealed between two substrates and a liquid crystal panel heater which warms the liquid crystal panel in order to improve response time of the liquid crystals, which is poor at a lower temperature. The liquid crystal panel heater includes a transparent conductive film disposed on the substrate of the liquid crystal panel and a pair of electrodes formed on the transparent conductive film. The pair of electrodes is for applying a voltage to the transparent conductive film and is arranged in a band form.

JP-A-2001-242439 discloses a technique in which the electrodes of the liquid crystal panel heater are provided with a plurality of openings for preventing the substrate of the liquid crystal panel from being bent.

However, according to the above-mentioned technique, because the electrodes are stripped off, the electrodes are likely eroded and thus the reliability of electrical connection between the transparent conductive film and the electrodes is degraded.

SUMMARY

An advantage of some aspects of the invention is that it provides an electro-optical device which has excellent adhesion and electrical reliability between a transparent conductive film and an electrode, and an electronic apparatus including the electro-optical device.

According to one aspect of the invention, there is provided an electro-optical device including an electro-optical panel having a first substrate and a second substrate which interpose an electro-optical material therebetween, a transparent conductive film disposed on an outer surface of the first substrate or the second substrate, and a base member having an electrode electrically connected to the transparent conductive film via an adhesive, in which the electrode is formed at a region having a plane shape which is the same as or narrower than that of the base member, the base member has concave portions or through-holes disposed along a side thereof, and the concave portions or the through-holes are filled with the adhesive.

According to this aspect, the base member has the concave portions or the through-holes disposed along the side thereof, and the concave portion or the through-hole is filled with the adhesive. Accordingly, when pressing and bonding the electrode against and to the transparent conductive film via the adhesive, the adhesive flows into the concave portion or the through-hole. As a result, thanks to the adhesive provided to the concave portion or the through-hole, it is possible to increase the contact area between the base member and the adhesive and enhance adhesion between the base member and the transparent conductive film. Here the term "concave portion" means both a concave portion depressed in a direction parallel to the plane of the base member, on which the electro-optical panel and the transparent conductive film overlap each other, and a concave portion which is depressed in a direction perpendicular to the plane of the base member and which extends in a direction from the transparent conductive film side to the base member side.

In the electro-optical device, the electrode is formed at a region having a plane shape which is narrower than the base member, and is electrically connected to the transparent conductive film via the adhesive. Accordingly, it is possible to realize secure contact between the transparent conductive film and the base member by the adhesive, and thus it is possible to enhance adhesion between the transparent conductive film and the electrode. Since the electrode is formed at a region having a plane shape which is the same as that of the base member, the base member having a larger plane shape than the electrode covers the electrode, and thus the electrode falls to the condition in which the electrode is sealed by the base member and the adhesive. Accordingly, the electrode is hardly affected by external ambient, and thus it is possible to prevent the electrode from being eroded and to improve the reliability of electrical connection between the electrode and the transparent conductive film.

According to this aspect, the electrode has the concave portion on the outer edge thereof, and the adhesive is provided so as to fill the concave portion of the electrode. Here the term "concave portion" means both a concave portion depressed in a direction parallel to the plane of the electrode, on which the electro-optical panel and the transparent conductive film overlap each other and a concave portion which is depressed in a direction perpendicular to the plane of the electrode and which extends in a direction from the transparent conductive film side to the base member side. Thanks to the structure, the electrode has the concave portion having the outer edge, to which the adhesive is introduced. Accordingly, it is possible to increase the contact area between the electrode and the adhesive. As a result, it is possible to enhance adhesion between the electrode and the transparent conductive film by the adhesive introduced into the concave portion. For example, in the case of pressing the electrode against the transparent conductive film with the adhesive interposed therebetween so that the electrode and the transparent conductive film are bonded to each other, it is satisfactory that a pressing area is small. That is, it is possible to decrease a pressing area and to surely cause conductive particles to break in the adhesive by pressing the electrode with higher pressure. As a result, it is possible to realize secure electrical connection between the electrode and the transparent conductive film via the conductive particles.

In the light-emitting device, it is preferable that the side surface of the electrode is coated with the adhesive.

In the light-emitting device, it is preferable that the through-hole is formed at a position where the through-hole does not overlap the electrode. Thanks to the structure, since the through-hole is formed not to overlap the electrode, it is possible to lead the adhesive into the through-hole when the electrode is pressure bonded to the transparent conductive film via the adhesive. As a result, it is possible to surely prevent the electrode and the base member from coming off the transparent conductive film.

In the light-emitting device, it is preferable that the concave portion of the electrode and the concave portion of the base member do not overlap each other in a plan view. Since the concave portion of the electrode and the concave portion of the base member are disposed not to overlap each other, the concave portion of the electrode and the concave portion of the base member can be formed in a lump manner by a punching process. Accordingly, it is possible to realize lower cost for forming the concave portions of the electrode and the base member as compared to the case in which the concave portions of the electrode and the base member have different shapes from each other.

In the light-emitting device, it is preferable that the through-hole of the base member is formed so as to face an opening of the concave portion of the electrode.

In the light-emitting device, it is preferable that the adhesive is an anisotropic conductive film. Since the adhesive is an anisotropic conductive film, conductive particles in the anisotropic conductive film must break by pressing the electrode against the transparent conductive film via the anisotropic conductive film. At this time, the adhesive is flown out and is introduced into the concave portion of the electrode by a pressure. As a result, it is possible to increase contact area by the adhesive which is flown out and is introduced into the concave portion by a pressure, and to enhance adhesion of the electrode. Further, it is possible to realize secure bonding between the base member and the transparent conductive film by the adhesive which is flown out to least the outer edge of the electrode by a pressure which is applied to the electrode. Still further, in the case in which the electrode is formed in a solid form, since the pressed area of the electrode is small, it is possible to increase a pressure applied to the conductive particles and thus it is possible to cause the conductive particles to surely break and to improve reliability of electrical connection between the electrode and the transparent conductive film via the conductive particles.

According to another aspect of the invention, there is provided an electronic apparatus including the electro-optical device.

According to this aspect, the electronic apparatus includes the electro-optical device having good adhesion and improved reliability of electrical connection between the electrode and the transparent conductive film. Accordingly, it is possible to realize the electronic apparatus having improved response time and high display quality by warming the liquid crystal panel by supplying electricity to the transparent conductive film via the first and second electrodes.

BRIEF DESCRIPTION OF THE DRAWINGS

Hereinafter, embodiments of the invention will be described with reference to the accompanying drawings.

DESCRIPTION OF EXEMPLARY EMBODIMENTS

Hereinafter, embodiments of the invention will be described with reference to the accompanying drawings. The following embodiments relate to a liquid crystal device serving as an electro-optical device, and more particularly to a reflective-transflective thin film transistor (TFT) active matrix type liquid crystal device and an electronic apparatus including the same liquid crystal device, but are not limited thereto. In the accompanying drawings, scales and numbers of elements in the structure may not be real scales and numbers but by adequately determined scales and numbers for convenience of illustration.

First Embodiment

Figure 1:
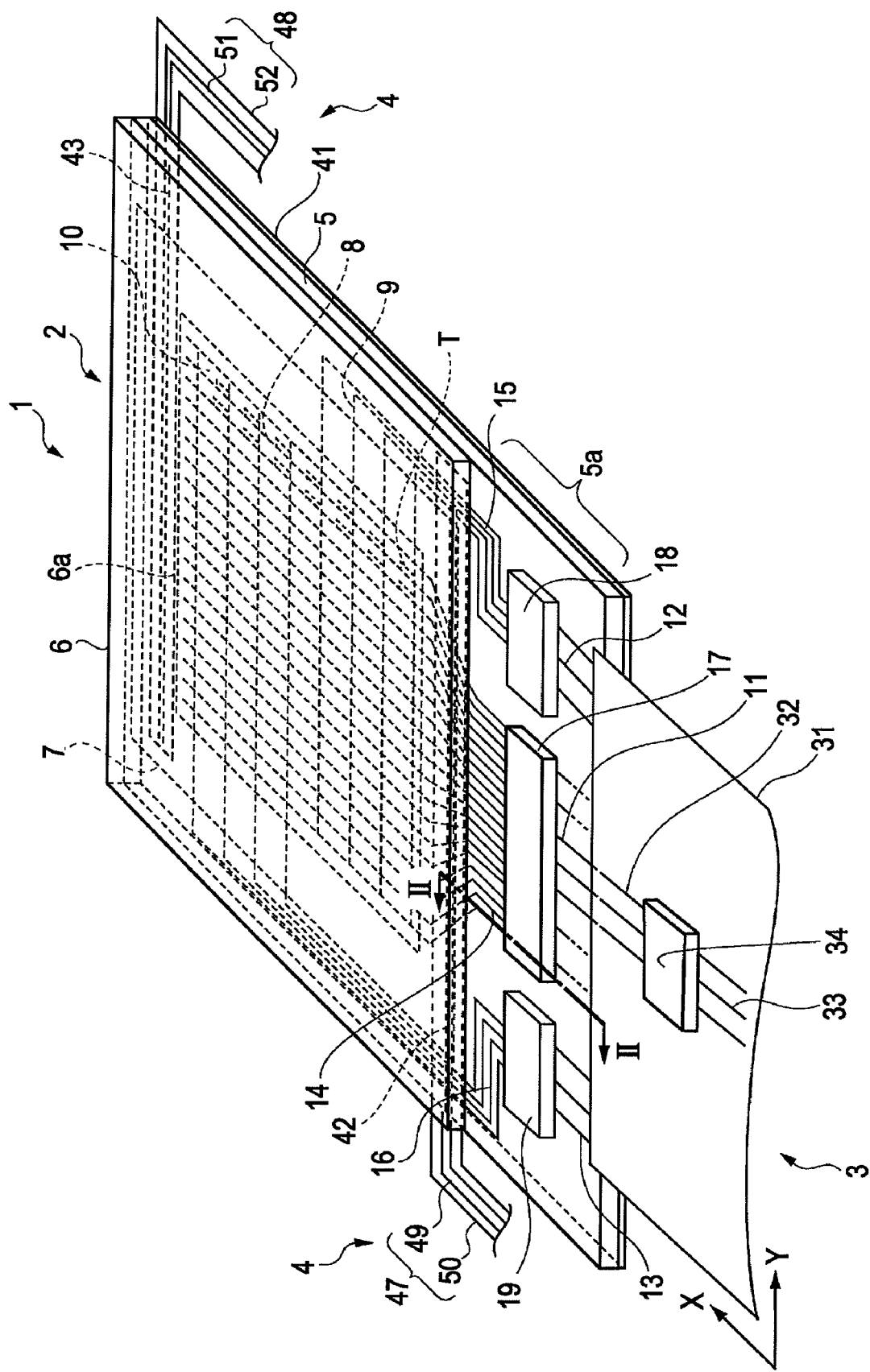
FIG. 1 is a schematic view illustrating a liquid crystal device according to a first embodiment of the invention.
Figure 2:
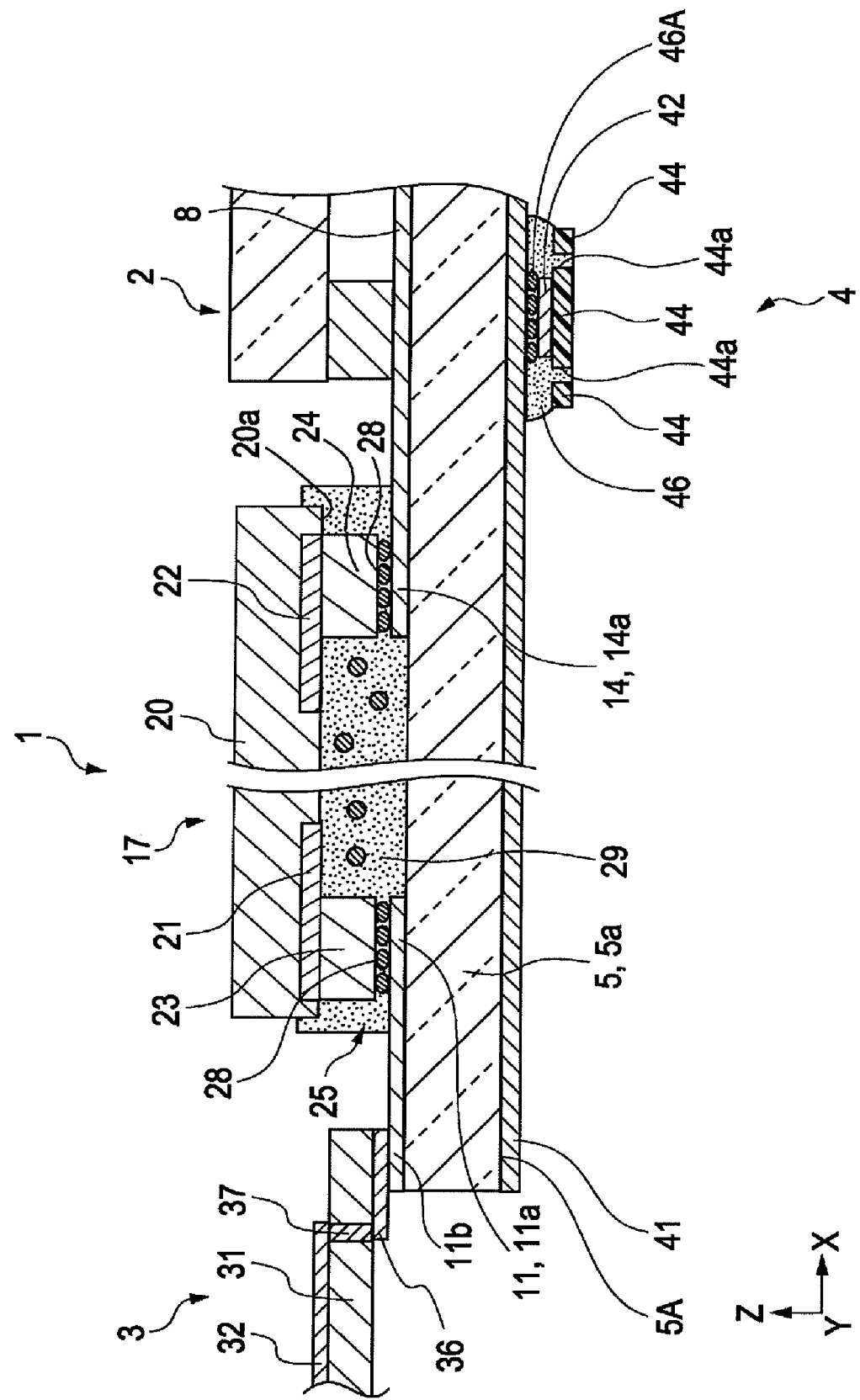
FIG. 2 is a sectional view taken along line II-II in the view of FIG. 1.
Figure 3:
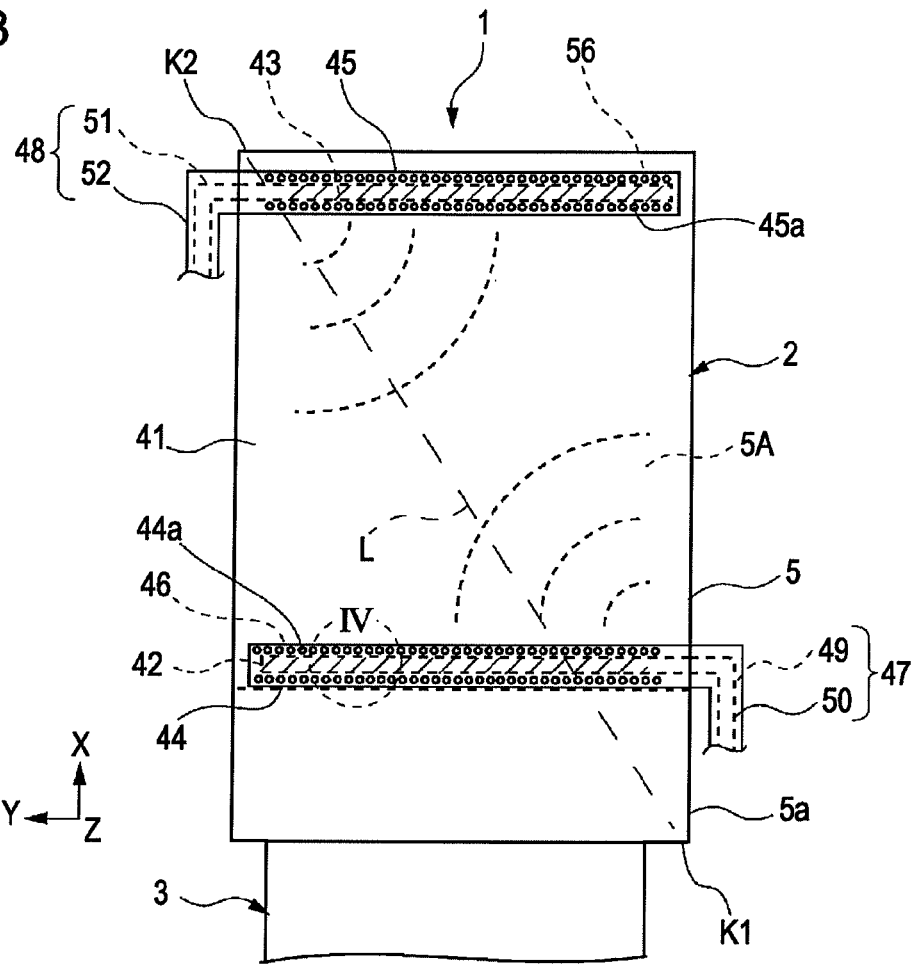
FIG. 3 is a bottom view illustrating the liquid crystal device shown in FIG. 1.
Figure 4:
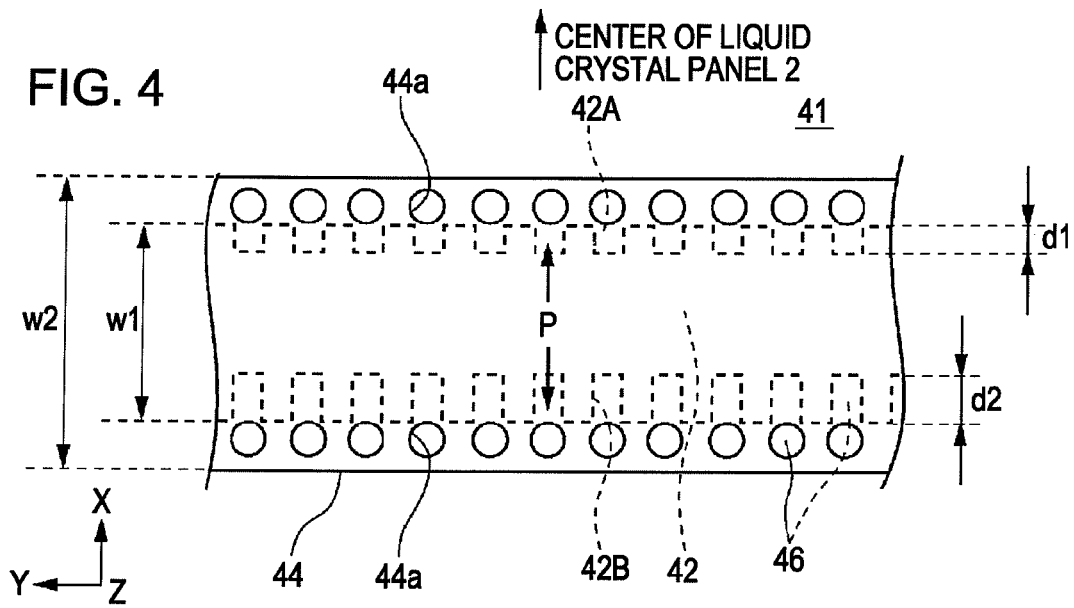
FIG. 4 is a plan view illustrating a region E (heater electrode) of the liquid crystal device shown in FIG. 3.

FIG. 1 shows a liquid crystal device according to a first embodiment. FIG. 2 is a sectional view taken along line II-II in FIG. 1. FIG. 3 is a bottom view illustrating the liquid crystal device shown in FIG. 1. FIG. 4 is a plan view illustrating a region E (a first heater electrode) of the liquid crystal device shown in FIG. 3.

Structure of Liquid Crystal Device

The liquid crystal device 1 includes a liquid crystal panel 2, a circuit board 3 connected to the liquid crystal panel 2, and a liquid crystal panel heater 4 which warms the liquid crystal panel 2. The liquid crystal device 1 further includes a frame (not shown) supporting the liquid crystal panel 2 and other accessory machines as required.

The liquid crystal panel 2 includes a substrate 5, a substrate 6 facing the substrate 5, a sealing member 7 interposed between the substrates 5 and 6, and liquid crystals (not shown) sealed by the substrates 5 and 6. The liquid crystals are twisted nematic (TN) liquid crystals.

The substrates 5 and 6 are plate-shaped members made of a translucent material such as glass and synthetic resin. Gate electrodes 8, source electrodes 9, thin film transistor elements T, and pixel electrodes 10 are formed on a surface of the substrate 5, which faces the liquid crystals, and a shared electrode 6a is formed on a surface of the substrate 6, which faces the liquid crystals.

The gate electrodes 8 and the source electrodes 9 extend in X direction and Y direction, respectively, and they are made of a metal such as aluminum. The upper half of the source electrodes 9 is biased to the left side and the lower half of the source electrodes 9 is biased to the right side. The number of lines of the gate electrodes 8 and the number of lines of source electrodes 9 are determined according to resolution and the size of a display region of the liquid crystal device 1.

Each of thin film transistor elements T includes three terminals connected to the corresponding gate electrode 8, the corresponding source electrode 9, and the corresponding pixel electrode 10, respectively. Thus, each of the thin film transistor elements T is connected to the corresponding pixel electrode 10, the corresponding gate electrode 8, and the corresponding source electrode 9. Thanks to such a structure, current flows in a direction from the source electrodes 9 to the pixel electrodes 10 or in the opposite direction when a voltage is applied to the gate electrodes 8.

The substrate 5 has a region 5a (hereinafter, referred to as protruding portion) which protrudes from the outer edge of the substrate 6. Input wirings 11, 12, and 13, and output wirings 14, 15, and 16 are disposed on the surface of the protruding portion 5a. Further, driver ICs 17, 18, and 19 for driving the liquid crystals are mounted on the surface of the protruding portion 5a.

As shown in FIG. 2, the input wiring 11 is connected to the driver IC 17 via conductive particles in a manner such that a first end 11a thereof (substrate-side input terminal 11a) is connected to a driver-side input terminal 23 of the driver IC 17. A second end 11b of the input wiring 11 is connected to a wiring 36 disposed on a flexible base member 31 of the circuit substrate 3 via an ACF (which is not shown). The input wirings 12 and 13 are connected to the driver ICs 18 and 19, respectively in a manner such that first ends (not shown) of the input wirings 12 and 13 are connected to driver-side input terminals (not shown) of the driver ICs 18 and 19, respectively.

As shown in FIG. 2, the out wiring 14 is connected to the driver IC 17 in a manner such that a first end 14a (substrate-side output terminal 14a) of the output wiring 14 is connected to a driver-side output terminal 24 of the driver IC 17 via conductive particles 28. A second end of the output wiring 14 is connected to the gate electrode 8. Further, the output wirings 15 and 16 are connected to the driver ICs 18 and 19, respectively in a manner such that first ends (not shown) of the output wirings 15 and 16 are connected to driver-side output terminals (not shown) of the driver ICs 18 and 19, respectively.

As shown in FIG. 2, the driver IC 17 is bonded to the substrate 5 via an ACF 25 disposed between the driver IC 17 and the substrate 5.

As shown in FIG. 2, the driver IC 17 includes a base member 20 and electrode pads 21 and 22 made of aluminum, which are disposed on a mounting surface 20a of the base member 20, which faces the substrate 5. The driver IC 17 further includes a plurality of driver-side input terminals 23 which are connected to the electrode pads 21 and 22 and protrudes from the mounting surface 20a of the driver IC 17, and a plurality of driver-side output terminals 24.

The electrode pads 21 are arranged on the mounting surface 20a of the base member 20 in a direction (Y direction) in which the gate electrodes 8 are arranged. The electrode pads 22 are arranged on the mounting surface 20a of the base member 20 in the direction (Y direction) in which the gate electrodes 8 extend while they are spaced apart from the electrode pads 21.

As shown in FIG. 2, the driver-side input terminal 23 and the driver-side output terminal 24 are connected to the electrode pads 21 and 22 and extend in the direction (Y direction) in which the gate electrodes 8 are arranged.

The ACF 25 has a structure in which conductive particles 28, which are elastic particles coated with a metal film, are contained in an adhesive 29.

As shown in FIG. 1, the circuit substrate 3 is connected to the protruding portion 5a via an adhesive such as ACF. The circuit substrate 3 includes a flexible base member 31, output wirings 32 and input wirings 33 disposed on the flexible base member 31, and a semiconductor IC 34 mounted on the flexible base member 31 for controlling the driver IC 17.

As shown in FIG. 1, the output wirings 32 extend in X direction and first ends of the output wirings 32 are connected to ends portions of the corresponding wirings 36 disposed on the flexible base member 31 via connection members 37 which are formed in through-holes shown in FIG. 2 provided to the flexible base member 31. Second ends of the output wirings 32 are connected to output terminals (not shown) of the semiconductor IC 34 via ACF.

As shown in FIG. 1, the input wirings 33 extend in the X direction. As shown in FIG. 1, first ends of the input wirings 33 are connected to input terminals (not shown) of the semiconductor IC 34 via ACF. Second ends of the input wirings 33 are connected to an external device (not shown).

As shown in FIGS. 1 to 3, the liquid crystal panel heater 4 includes a transparent conductive film 41 (see FIG. 1) disposed so as to overlap the substrate 5 in a plan view, a first heater electrode 42 and a second heater electrode 43 (see FIG. 3) which are electrically connected to the transparent conductive film 41, a first heater flexible substrate 44 and a second heater flexible substrate 45 (see FIG. 3) which are arranged so as to cover the first heater electrode 42 and the second heater electrode 43, respectively, an ACF 46 disposed between the first and second heater flexible substrates 44 and 45 and the transparent conductive film 41, a first heater wring 47 and a second heater wiring 48 which extend from the first heater electrode 42 and the second heater electrode 43, respectively, and a power source (not shown). The power source is a direct current (DC) power source.

As shown in FIG. 2, the transparent conductive film 41 is formed over almost the entire area of the surface 5A (outer surface) of the substrate 5, which is the farther-side surface from the substrate 6. The transparent conductive film 41 is made of a transparent material such as indium tin oxide (ITO).

As shown in FIG. 3, the first heater electrode 42 is disposed so as to elongate in a direction (Y direction in FIG. 3) perpendicular to the longitudinal direction (X direction in FIG. 3) of the liquid crystal panel 2. Further, as shown in FIG. 2, the first heater electrode 42 is electrically connected to the transparent conductive film 41 via the ACF 46 (i.e. conductive particles 46A of the ACF 46). As shown in FIG. 3, the first heater electrode 42 is electrically connected to an end portion (on the protruding portion 5a side) of the liquid crystal panel 2 in the longitudinal direction (X direction in FIG. 3) of the liquid crystal panel 2.

As shown in FIG. 4, the first heater electrode 42 is formed at a region having a narrower area than (or the same area as) the first heater flexible substrate 44 in a plan view. The first heater electrode 42 may be formed at a region having the same area as the first heater flexible substrate 44 in a plan view. As shown in FIG. 4, the first heater electrode 42 has a concave shape. For example, as shown in FIG. 4, the first heater electrode 42 has a rectangular shape in which a width of the first heater electrode 42 in the longitudinal direction (X direction in FIG. 3) of the liquid crystal panel 2 is a first width w1. The first heater electrode 42 has a plurality of first concave-shaped portions 42A arranged in the widthwise direction (Y direction in FIG. 3) of the liquid crystal panel 2 and disposed at a position relatively near the center portion of the liquid crystal panel 2, and a plurality of concave-shaped portions 42B arranged in the widthwise direction (Y direction in FIG. 3) of the liquid crystal panel 2 and disposed at a position relatively far from the center portion of the liquid crystal panel 2. The first heater electrode 42 is plated with gold.

As shown in FIG. 4, the first concave-shaped portions 42A are formed on the outer edge of the first heater electrode 42 and are depressed in the longitudinal direction (X direction in FIG. 3) in a manner of going farther apart from a center portion of the liquid crystal panel 2. The second concave-shaped portions 42B are formed on the outer edge of the first heater electrode 42 and depressed in the longitudinal direction (X direction in FIG. 3) in a manner of approaching the center of the liquid crystal panel 2. The depth d2 of the second concave-shaped portions 42B is longer than the depth d1 of the first concave-shaped portions 42A.

As shown in FIG. 3, the second heater electrode 43 is electrically connected to the transparent conductive film 41 via the ACF 56 at positions which are different from the positions where the first heater electrode 42 is connected to the transparent conductive film 41. As shown in FIG. 3, the second heater electrode 43 is electrically connected to the transparent conductive film 41 at an end portion of the liquid crystal panel 2, in the longitudinal direction (X direction in FIG. 3), which is on the opposite side of the protruding portion 5a via an ACF 56 (conductive particles which are not shown).

The first heater flexible substrate 44 is formed of resin such as polyimide. As shown in FIGS. 2 to 4, the first heater flexible substrate 44 is disposed so as to cover the first heater electrode 42. The heater flexible substrate 44 has a plane shape which is wider than the first heater electrode 42. As shown in FIG. 4, a second width w2 which is the width of the first heater flexible substrate 44 is larger than the first width w1 of the first heater electrode 42. As shown in FIGS. 2 to 4, the first heater flexible substrate 44 is provided with a plurality of through-holes 44a. As shown in FIG. 4, the through-holes 44a are formed along each of paired sides of the first heater flexible substrate 44 and disposed outside the outer edge of the first heater electrode 42. As shown in FIGS. 2 and 4, the ACF 46 is introduced into the through-holes 44a.

As shown in FIG. 3, the second heater flexible substrate 45 is different from the first heater flexible substrate 44 from the point that the second heater flexible substrate 45 covers the second heater electrode 43. As shown in FIG. 3, the second heater flexible substrate 45 is provided with a plurality of through-holes 45a into which the ACF 56 is disposed.

As shown in FIG. 4, the ACF 46 disposed between the first heater flexible substrate 44 and the transparent conductive film 41 is introduced into the first concave-shaped portions 42A and the second concave-shaped portions 42B of the first heater electrode 42. As shown in FIGS. 2 and 4, the ACF 46 is introduced into the through-holes 44a of the first heater flexible substrate 44. Still further, as shown in FIG. 2, the ACF 46 is disposed between the transparent conductive film 41 and the first heater flexible substrate 44 so as to have a shape having the second width w2 larger than the first width w1 of the first heater electrode 42. The ACF 46 is disposed between the first heater flexible substrate 44 and the transparent conductive film 41 so as to overlap the first heater electrode 42 in a plan view and to extend to a position apart outward from the outer edge 42H of the first heater electrode 42.

The first heater wiring 47 includes the first wiring 49 extending outward from the first heater electrode 42 and the first heater wiring substrate 50 extending outward from the first heater flexible substrate 44. The first wiring 49 is connected to a positive terminal of a power source (not shown).

The second heater wiring 48 includes the second wiring 51 extending outward from the second heater electrode 43 and the second heater wining substrate 52 extending outward from the second heater flexible substrate 45. The second wiring 51 is connected to an earth electrode of the power source (not shown).

Manufacturing Method of Liquid Crystal Device 1

Hereinafter, a manufacturing method of the liquid crystal device 1 will be described with reference to the drawings.

Figure 5:
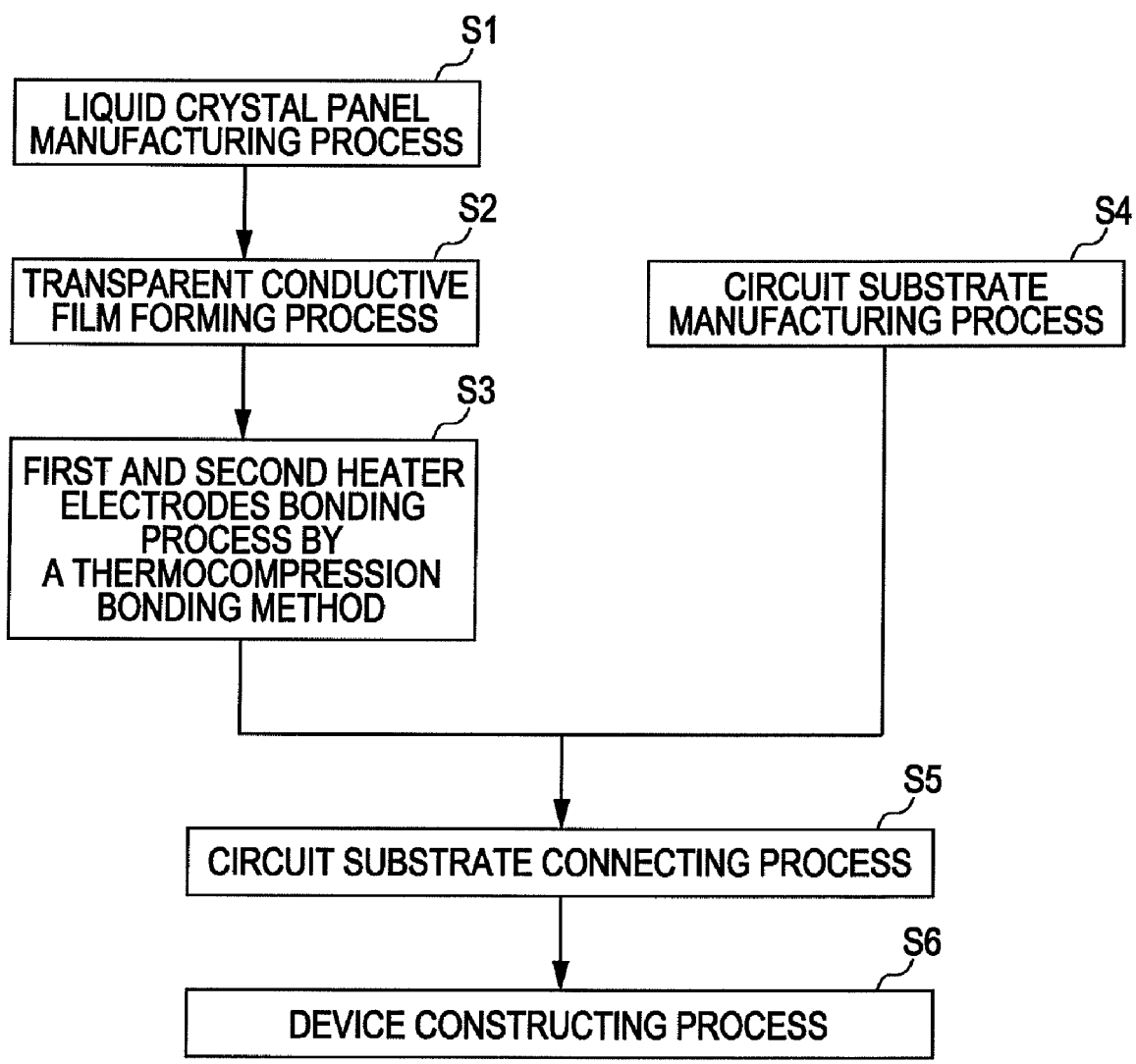
FIG. 5 is a flowchart illustrating a manufacturing method of the liquid crystal device according to the first embodiment.

FIG. 5 is a flowchart illustrating a manufacturing method of the liquid crystal device 1 according to a first embodiment. This embodiment focuses connecting processes (S2 to S3) between the liquid crystal panel heater 4 and the liquid crystal panel to each other.

First of all, the liquid crystal panel 2 is manufactured (S1).

Next, the transparent conductive film 41 is formed over almost the entire area of the surface 5A of the substrate 5 of the liquid crystal panel 2 (S2). A polarizing plate is not disposed on the surface 5A of the substrate 5.

Next, etching and laser beam machining are performed with respect to the first heater flexible substrate 44 on which the first heater electrode 42 is patterned, and thus the first heater flexible substrate 44 provided with the through-holes 44a is manufactured.

Next, the ACF 46 containing conductive particles 46A therein is attached to the transparent conductive film 41 disposed on an end portion of the liquid crystal panel 2, which is on the protruding portion 5a side. The first heater electrode 42 formed on the first heater flexible substrate 44 is disposed so as to overlap the ACF 46 in a plan view, and the first heater flexible substrate 44 and the first heater electrode 42 are bonded to each other by a thermocompression bonding method using a pressure bonding head (S3).

At this time, as shown in FIG. 4, the ACF 46 disposed between the first heater flexible substrate 44 and the transparent conductive film 41 is flown into the first concave-shaped portions 42A and the second concave-shaped portions 42B in a direction of the arrow P by a pressure. The ACF 46 is flown into the first concave-shaped portions 42A and the second concave-shaped portions 42B. The ACF 46 is pressed so as to flow into the through-holes 44a provided to the first heater flexible substrate 44 by a pressure. Thus, the ACF 46 is introduced into the through-holes 44a. Further, the ACF 46 having at least the second width w2 is disposed between the transparent conductive film 41 and the first heater flexible substrate 44. As a result, amount of the ACF 46 running off the edge of the first concave-shaped portions 42A is smaller than that of the ACF 46 running off the edge of the second concave-shaped portions 42B.

Next, the liquid crystal panel 2 and the circuit substrate 3 manufactured through step S4 are electrically connected to each other via a conductive adhesive (S5), and then a backlight unit, a polarizing plate, and a reflective sheet are additionally provided to the liquid crystal panel. As a result, the liquid crystal device 1 is manufactured (S6).

This is the end of the description about the manufacturing method of the liquid crystal device 1.

According to the above-described embodiment of the invention, the electro-optical device includes the liquid crystal panel 2 having substrate 5 and 6, the transparent conductive film 41 disposed on the outer surface of the substrate 5, and the first heater flexible substrate 44 having the first heater electrode 42 electrically connected to the transparent conductive film via the ACF 46, in which the first heater electrode 42 is formed at a region having a plane shape which is smaller than that of the first heater flexible substrate 44, the first heater flexible substrate 44 is provided with the through-holes 44a, and the through-holes 44a are filled with the ACF 46. Accordingly, it is possible to achieve secure bonding between the transparent conductive film 41 and the first heater flexible substrate 44 due to the ACF 46 filling the through-holes 44a. Thus, it is possible to securely bond the outer edge of the first heater flexible substrate 44 to the transparent conductive film by the ACF 46 at a position where the first heater flexible substrate 44 is apt to strip off the transparent conductive film. As a result, it is possible to enhance adhesion between the transparent conductive film 41 and the first heater electrode 42.

The first heater electrode 42 is formed at a region having a plane shape which is smaller than that of the first heater flexible substrate 44 and includes the first heater flexible substrate 44 disposed so as to cover the first heater electrode 42. Accordingly, the first heater electrode 42 is sealed by the first heater flexible substrate 44 and the ACF 46. As a result, it is possible to prevent the first heater electrode 42 from being eroded due to ambient air and improve reliability of electrical connection between the first heater electrode 42 and the transparent conductive film 41.

Further, the first heater electrode 42 includes the first concave-shaped portions 42A and the second concave-shaped portions 42B into which the ACF 46 is flown. Accordingly, the it is possible to increase the contact area between the first heater electrode 42 provided with the first concave-shaped portions 42A and the second concave-shaped portions 42B and the ACF 46. As a result, it is possible to enhance adhesion between the transparent conductive film 41 and the first heater electrode 42 by the ACF 46 flown in to the first concave-shaped portions 42A. For example, in the case of pressing the first heater electrode 42 against the transparent conductive film 41 via the ACF 46 for bonding, a pressing area is decreased and thus It is possible to surely cause the conductive particles 46A in the ACF 46 to break by increased force. As a result, it is possible to achieve secure electrical connection between the transparent conductive film 41 and the first heater electrode 42 via the conductive particles 46A in the ACF 46.

The through-holes 44a of the first heater flexible substrate 44 is filled with the ACF 46 when the first heater electrode 42 is pressed against the transparent conductive film 41 for bonding. As a result, it is possible to increase the contact area between the ACF and the first heater flexible substrate 44 due to the ACF 46 introduced into the through-holes 44a.

The through-holes 44a are formed along each of paired sides of the first heater flexible substrate 44 and disposed outside the outer edge of the first heater electrode 42. Accordingly, when the first heater electrode 42 is pressed against and bonded to the transparent conductive film 41 via the ACF 46, it is possible to directly lead the ACF 46 to the inside the through-holes 44a between the transparent conductive film 41 and the first heater electrode 42. Thus, it is possible to securely prevent the first heater electrode 42 and the first heater flexible substrate 44 from coming off the transparent conductive film 41.

The first heater electrode 42 includes a plurality of first concave-shaped portions 42A disposed relatively near the center portion of the liquid crystal panel 2 and a plurality of second concave-shaped portions 42B disposed relatively far from the center portion of the liquid crystal panel 2. The depth d2 of the second concave-shaped portions 42B is longer than the depth d1 of the first concave-shaped portions 42A. Accordingly, when the first heater electrode 42 is pressed against and bonded to the transparent conductive film 41 via the ACF 46, it is possible to lead much amount of the ACF 46 to the first concave-shaped portions 42A than the second concave-shaped portions 42B. Accordingly, it is possible to reserve an empty region in which the ACF 46 is not disposed at a position relatively near the center portion of the liquid crystal panel 2 to the first heater electrode 42 and thus it is possible to install a polarizing plate at the reserved empty region.

The first heater electrode 42 is connected to the first wiring 49 at a first corner portion K1 of the liquid crystal panel 2, and the second heater electrode 43 is connected to the second wiring at a second corner portion K2 of the liquid crystal panel 2 in which the second corner portion K2 is opposite the first corner portion K1. That is the second corner portion K2 is on the diagonal line of the liquid crystal panel 2, which passes the first corner portion K2. Thanks to such a structure, it is possible to heat the liquid crystal panel 2 from the first corner portion K1 as a heating starting point via the first wiring 49 and also simultaneously to heat the liquid crystal panel 2 form the second corner portion K2 as a heating starting point via the second wiring 51. Thus, it is possible to decrease the bias of the heat in a plane when warming the liquid crystal panel 2. That is, it is possible to heat the liquid crystal panel 2 without the bias of heat in a plane.

The transparent conductive film 41 is formed on the surface 5A of the substrate 5. Accordingly, it is possible to realize the thinner liquid crystal device 1 and suppress the increase of the number of processes of the manufacturing method of the liquid crystal device.

The first heater electrode 42 does not overlap the driver ICs 17, 18, and 19 in a plan view but is disposed so as to overlap the sealing member 7 disposed between the substrates 5 and 6 in a plane view. Accordingly, when pressing and bonding the first heater electrode 42 against and to the substrate 5, it is easy to maintain flatness of the first heater electrode 42 and it is possible to achieve secure bonding between the first heater electrode 42 and the substrate 5. Further, since the first heater electrode 42 is disposed near the liquid crystals (at a position where it overlaps the sealing member 7 in a plan view), it is possible to effectively warm the liquid crystals.

In the case in which there is the likelihood that the surface of the liquid crystal panel of the liquid crystal device is elastically charged, the transparent conductive film 41 also functions as an element which eliminates static electricity (fringe field switching (FFS).

Figure 6:
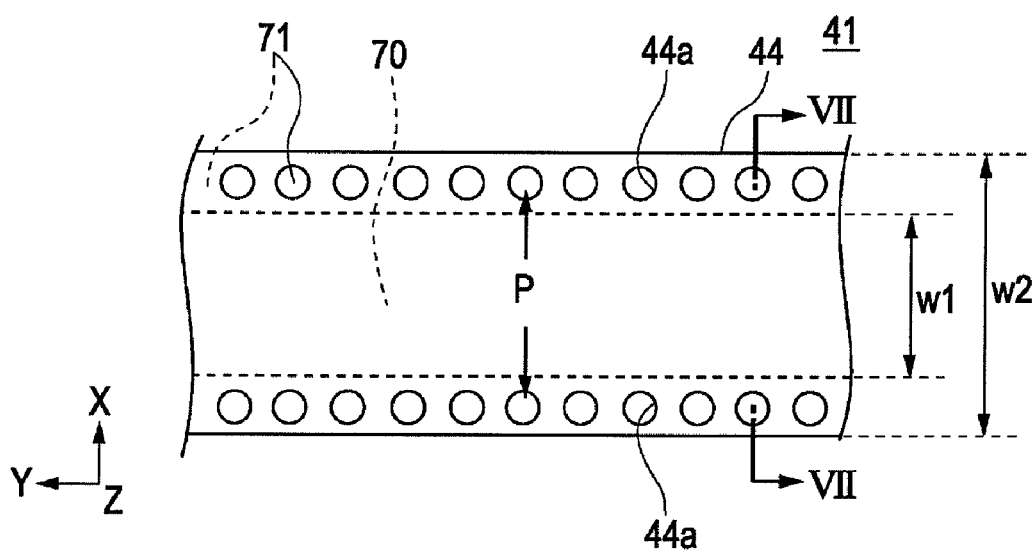
FIG. 6 is a partial plan view illustrating a heater electrode (solid electrode) of a liquid crystal device.
Figure 7:
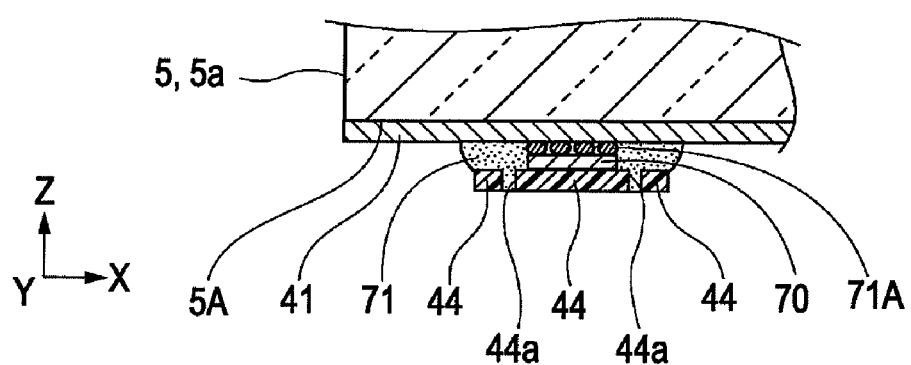
FIG. 7 is a sectional view taken along line VII-VII shown in FIG. 6.

FIG. 6 is a partial plan view illustrating a heater electrode (solid electrode) of a different liquid crystal device, and FIG. 7 is a sectional view illustrating the liquid crystal device shown in FIG. 6 and taken along line VII-VII.

As shown in FIGS. 6 and 7, the liquid crystal device includes a rectangular shaped first heater electrode 70 instead of the concave-shaped first heater electrode 42 used in the first embodiment.

As shown in FIGS. 6 and 7, the first heater electrode 70 has a rectangular shape having a first width w1 which is smaller than a second width w2 which is the width of the first heater flexible substrate 44. As shown in FIG. 6, the first heater electrode 70 is disposed at a position where the first heater electrode 70 is spaced apart from the through-holes 44a provided to the first heater flexible substrate 44 in the widthwise direction (X direction in FIG. 6).

As shown in FIGS. 6 and 7, the first heater flexible substrate 44 is provided with a plurality of through-holes 44a. As shown in FIGS. 6 and 7, the ACF 71 disposed between the transparent conductive film 41 and the first heater flexible substrate 44 is introduced into the through-holes 44a.

That is, since the ACF 71 flows into the through-holes 44a as well as flows between the transparent conductive film 41 and the first heater flexible substrate 44, it is possible to increase the contact area between the ACF 71 and the first heater flexible substrate 44. As a result, it is possible to enhance adhesion between the first heater electrode 70 and the transparent conductive film 41 having the ACF 71 interposed therebetween. When providing the first heater electrode 70 to the first heater flexible substrate 44, it is possible to realize lower cost because there is no need to form electrode patterns.

First Modification

Next, a liquid crystal device according to a first modification and a manufacturing method of the liquid crystal device according to the first modification will be described below. Hereinafter, like elements and members as in the above-described embodiments will be represented by like reference symbols.

Figure 8:
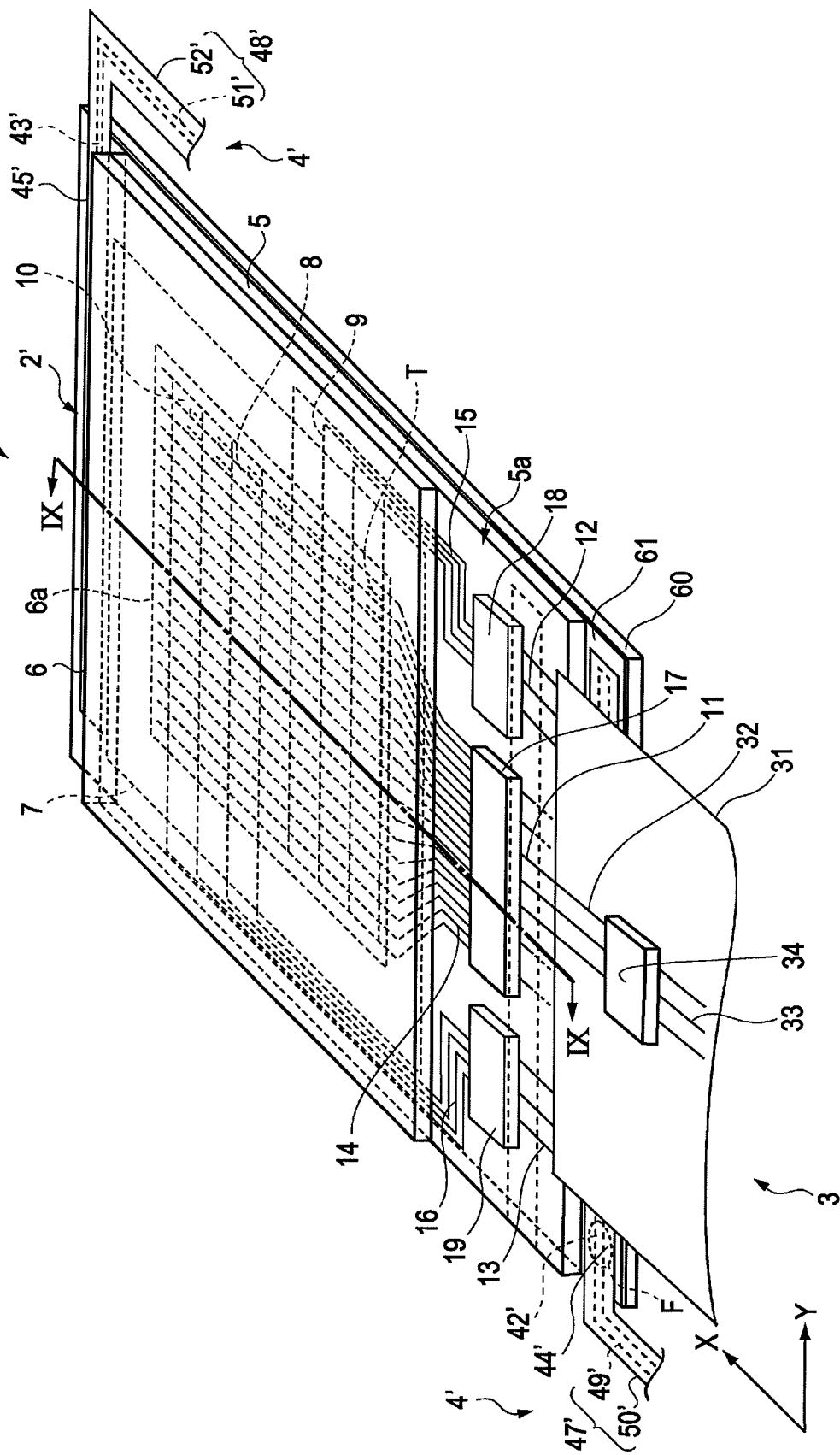
FIG. 8 is a schematic perspective view illustrating a liquid crystal device according to a first modification.
Figure 9:
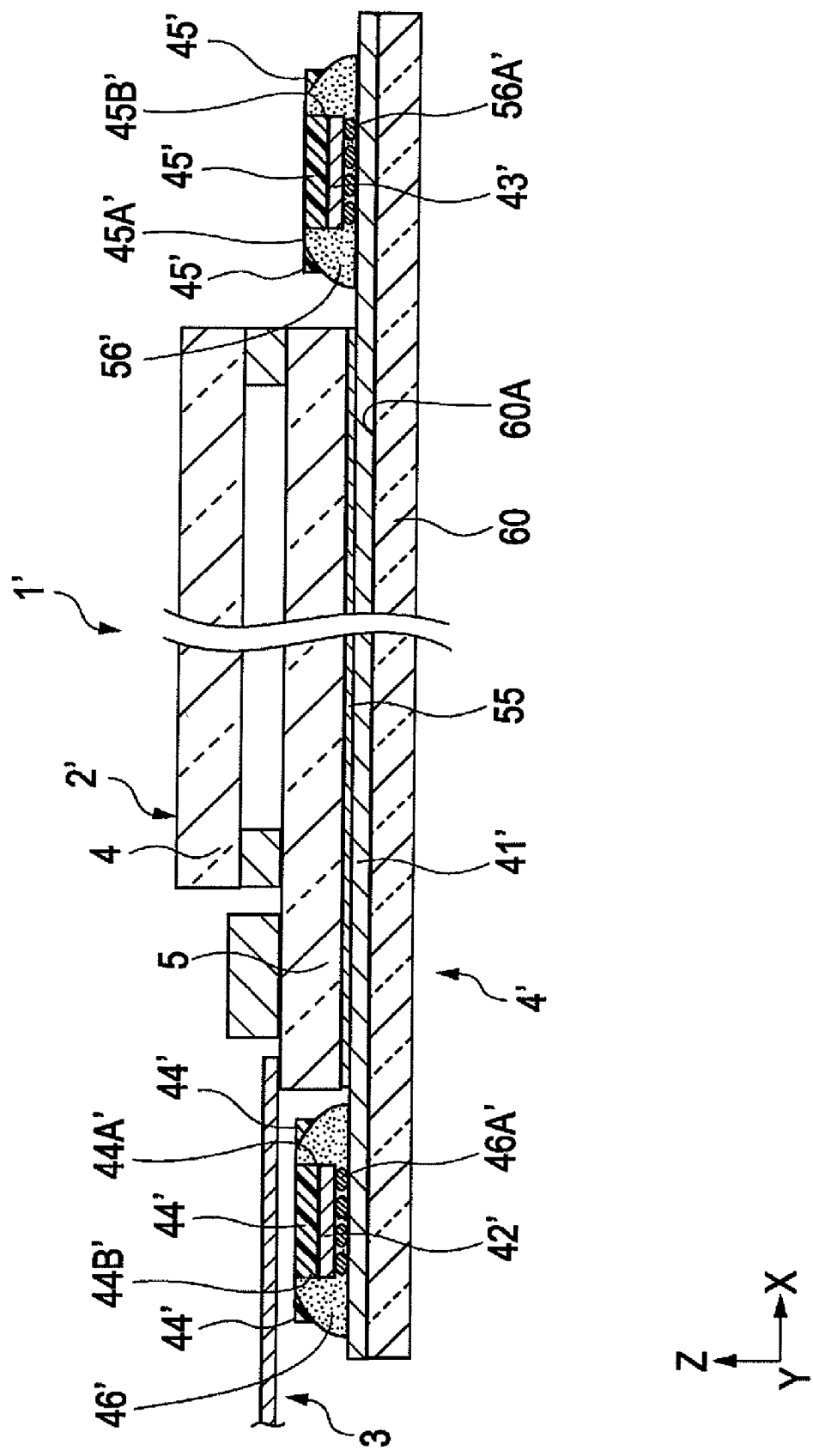
FIG. 9 is a sectional view taken along line IX-IX shown in FIG. 8.
Figure 10:
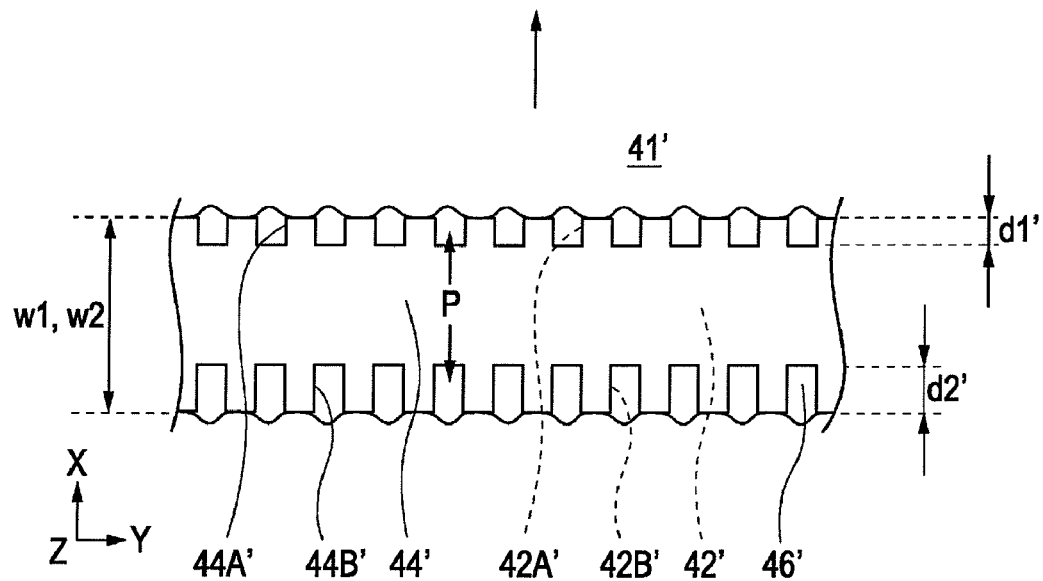
FIG. 10 is a partial plan view illustrating a heater electrode (region F) of the liquid crystal device shown in FIG. 8.

FIG. 8 is a schematic perspective view illustrating the liquid crystal device according to the first modification. FIG. 9 is a sectional view taken along line IX-IX in the liquid crystal device shown in FIG. 8. FIG. 10 is a plan view illustrating a region F (first heater electrode) of the liquid crystal device shown in FIG. 8.

The liquid crystal device 1' according to the first modification includes a liquid crystal panel 2', a circuit substrate 3 connected to the liquid crystal panel 2', and a liquid crystal panel heater 4'. The circuit substrate 3 used in the liquid crystal device 1' has almost the same structure as the circuit substrate 3 used in the liquid crystal device 1.

The liquid crystal panel 2' is different from the liquid crystal panel 2 in association with the first embodiment from the point that it includes a polarizing plate 55 disposed on the outer side of a substrate 5.

As shown in FIGS. 8 and 9, the liquid crystal panel heater 4' includes a transparent substrate 60, a transparent conductive film 41' disposed on the substrate 60, a first heater electrode 42' and a second heater electrode 43' electrically connected to the transparent conductive film 41', a first heater flexible substrate 44' and a second heater flexible substrate 45' disposed so as to cover the first and second heater electrodes 42' and 43', respectively, an ACF 46' disposed at least between the first and second heater flexible substrates 44' and 45' and the transparent conductive film 41', a first wiring 47 and a second wiring 48 extending from the first and second heater electrodes 42' and 43', respectively, and a power source which is not shown. The power source is a direct current power source.

The substrate 60 is a plate-shaped member made of a translucent material such as glass and synthetic resin.

As shown in FIG. 9, the transparent conductive film 41' is formed over almost the entire area of the surface 60A of the substrate 60, which is on the substrate 5 side (see FIG. 8). The transparent conductive film 41' is made of a transparent material such as ITO.

As shown in FIG. 8, the first heater electrode 42' is disposed so as to elongate in a direction (Y direction in FIG. 8) perpendicular to the longitudinal direction (X direction in FIG. 8) of the liquid crystal panel 2'. Further, as shown in FIG. 9, the first heater electrode 42' is electrically connected to the transparent conductive film 41' via the ACF 46' (i.e. conductive particles 46A'). As shown in FIG. 8, the first heater electrode 42' is electrically connected to an end portion (on the protruding portion 5a side) of the liquid crystal panel 2 in the longitudinal direction (X direction in FIG. 8) of the liquid crystal panel 2'.

As shown in FIG. 10, the first heater electrode 42' has a concave shape. For example, as shown in FIG. 10, the first heater electrode 42' has a width, which is the same as the first width w1, in the longitudinal direction (X direction in FIG. 10), and includes a plurality of first concave-shaped portions 42A' arranged in the widthwise direction (Y direction in FIG. 10) of the liquid crystal panel 2' and disposed at a position relatively near the center portion of the liquid crystal panel 2' and a plurality of second concave-shaped portions 42B arranged in the widthwise direction (Y direction in FIG. 10) of the liquid crystal panel 2' and disposed at a position relatively far from the center portion of the liquid crystal panel 2'.

As shown in FIG. 10, the first concave-shaped portions 42A' are formed on the side surface of the first heater electrode 42' and are depressed in the longitudinal direction (X direction in FIG. 8) in a manner of being farther apart from the center portion of the liquid crystal panel 2'. The second concave-shaped portions 42B' are formed on the side surface of the first heater electrode 42 and depressed in the longitudinal direction (X direction in FIG. 10) in a manner of approaching the center portion of the liquid crystal panel 2'. The depth d2' of the second concave-shaped portions 42B' is longer than the depth d1' of the first concave-shaped portions 42A'.

As shown in FIG. 9, the second heater electrode 43' is electrically connected to the transparent conductive film 41' via an ACF 56' at positions which are different from the positions where the first heater electrode 42' is connected to the transparent conductive film 41'. As shown in FIG. 9, the second heater electrode 43' is electrically connected to the transparent conductive film 41' at an end portion of the liquid crystal panel 2', in the longitudinal direction (X direction in FIG. 9) of the liquid crystal panel 2', which is on the opposite side of a protruding portion 5a via the ACF 56' (conductive particles 56A') as sown in FIG. 9.

The first heater flexible substrate 44' is formed of resin such as polyimide. As shown in FIGS. 8 to 10, the first heater flexible substrate 44' is disposed so as to cover the first heater electrode 42'. As shown in FIG. 8, a second width w2 which is the width of the first heater flexible substrate 44' is almost the same as the first width w1 of the first heater electrode 42'. On sides of the first heater flexible substrate 44', which make a pair, the concave-shaped portions are formed along the respective sides. For example, as shown in FIG. 10, a plurality of third concave-shaped portions 44A' and a plurality of fourth concave-shaped portions 44B'. The third concave-shaped portions 44A' are disposed so as to overlap the first concave-shaped portions 42A' of the first heater electrode 42' in a plan view. The fourth concave-shaped portions 44B' are disposed so as to overlap the second concave-shaped portions 43B' of the second heater electrode 43' in a plan view.

As shown in FIG. 9, the second heater flexible substrate 45' is different from the first heater flexible substrate 44' from the point that the second heater flexible substrate 45' overlaps and covers the second heater electrode 43'.

As shown in FIG. 9, the ACF 46' flows between the first heater flexible substrate 44' and the transparent conductive film 41' and flows into the first concave-shaped portions 42A' and the second concave-shaped portions 42B' of the first heater electrode 42'. As shown in FIGS. 9 and 10, the ACF 46 is disposed between the first heater flexible substrate 44 and the transparent conductive film 41 so as to have a width the same as the second width w2 of the first heater flexible substrate 44' which is almost the same as the first width w1 of the first heater electrode 42'. The ACF 56' is disposed in a similar manner with the ACF 46'.

As shown in FIG. 8, the first heater wiring 47' includes a first wiring 49' extending outward from the first heater electrode 42' and a first heater wiring substrate 50' extending outward from the first heater flexible substrate 44'. The first wiring 49' is connected to a positive terminal of a power source (not shown).

As shown in FIG. 8, the second heater wiring 48' includes the second wiring 51' extending outward from the second heater electrode 43' and the second heater wining substrate 52' extending outward from the second heater flexible substrate 45'. The second wiring 51' is connected to an earth electrode of the power source (not shown).

Manufacturing Method of Liquid Crystal Device 1'

Hereinafter, a manufacturing method of the liquid crystal device 1' will be described with reference to the drawings.

In this modification, since a manufacturing method of the circuit substrate 3 is a known method, description of the manufacturing method of the circuit substrate 3 will be omitted. This modification focuses connecting processes between the liquid crystal panel heater 4' and the liquid crystal panel 2'.

First, the liquid crystal panel 2' is manufactured (S1). At this time, a polarizing plate 55 is disposed on the outer side of the substrate 5.

Next, the transparent conductive film 41' is formed over almost the entire area of the surface 60A of a substrate 60.

Next, the first heater electrode 42 provided with the first concave-shaped portions 42A' and the second concave-shaped portions 42B' is manufactured by performing punching processing with respect to a wiring substrate in which a metal film which becomes the first heater electrode 42 is formed on a flexible substrate which becomes the first heater flexible substrate 44'.

Next, the ACF 46' containing conductive particles 46A' therein is attached to the transparent conductive film 41' at an end portion of the substrate 60. The ACF 56' is attached to the transparent conductive film 41' on the other end side of the substrate 60. The first heater electrode 42' formed on the first heater flexible substrate 44' is disposed so as to overlap the ACF 46' in a plan view, and the first heater flexible substrate 44' and the first heater electrode 42' are bonded to each other by a thermocompression bonding method using a pressure bonding head (Such a thermocompression bonding is also performed with respect to the second heater 43')

At this time, as shown in FIG. 10, the ACF 46' disposed between the first heater flexible substrate 44' and the transparent conductive film 41' is flown into the first concave-shaped portions 42A' and the second concave-shaped portions 42B' in a direction of the arrow P by a pressure. Thus, the ACF 46' is flown into the first concave-shaped portions 42A' and the second concave-shaped portions 42B'. Further, the ACF 46' is disposed between the transparent conductive film 41' and the first heater flexible substrate 44' so as to have at least the second width w2.

Next, the liquid crystal panel 2 and the circuit substrate 3 are electrically connected to each other via a conductive adhesive (not shown), thereby manufacturing the liquid crystal device 1 by installing a backlight unit and so on.

This is the end of the description about the manufacturing method of the liquid crystal device 1'.

According to the above-described structure, the first heater electrode 42' has the first concave-shaped portions 42A' and the second concave-shaped portions 42B' into which the ACF 46' is introduced when the first heater electrode 42' is bonded to the transparent conductive film 41' by a pressure bonding method. Accordingly, it is possible to increase the contact area between the ACF 46' and the first concave-shaped portions 42A' and between the ACF 46' and the second concave-shaped portions 42B'. As a result, it is possible to enhance adhesion between the first heater electrode 42' and the first heater flexible substrate 44' by the ACF 46' provided to the first concave-shaped portions 42A' and the second concave-shaped portions 42B'. For example, when pressing and bonding the first heater electrode 42' against and to the transparent conductive film 41', a pressing area is decreased and thus it is possible to cause the conductive particles 46A' in the ACF 46' to surely break by stronger force. As a result, it is possible to achieve secure electrical connection between the transparent conductive film 41' and the first heater electrode 42' via the ACF particles 46A'.

The third concave-shaped portions 44A' and the fourth concave-shaped portions 44B' of the first heater flexible substrate 44' are disposed so as to overlap the first concave-shaped portions 42A' and the second concave-shaped portions 42B of the first heater electrode 42' in a plan view. Accordingly, it is possible to form the first concave-shaped portions 42A' and the third concave-shaped portions 44A', and the second concave-shaped portions 42B' and the fourth concave-shaped portions 44B' in a lump manner by punching processing in a lump manner as compared to the case in which the first concave-shaped portions 42A' and the second concave-shaped portions 42B' of the first heater electrode 42' and the third concave-shaped portions 44A' and the fourth concave-shaped portions 44B' are different from each other in the shape. As a result, it is possible to decrease the manufacturing cost. For example, when pressing and bonding the first heater electrode 42' against and to the transparent conductive film 41' with the ACF 46' interposed therebetween, the ACF 46' flows into the third concave-shaped portions 44A' and the fourth concave-shaped portions 44B' of the first heater flexible substrate 44. As a result, the ACF 46' is flown out from between the transparent conductive film 41' and the first heater flexible substrate 44' by a pressure applied thereto, and thus it is possible to easily bond the first heater electrode 42' to the transparent conductive film 41'. Consequently, it is possible to achieve secure electrical connection between the transparent conductive film 41' and the first heater electrode 42' via the ACF 46'.

Further, the third concave-shaped portions 44A' and the fourth concave-shaped portions 44B' of the first heater flexible substrate 44' are disposed at the outer side of the outer edge of the first heater electrode 42', along each side of sides of the first heater flexible substrate 44' which make a pair. Accordingly, for example, when pressing and bonding the first heater electrode 42' against and to the transparent conductive film 41' with the ACF 46' interposed therebetween, it is possible to rapidly lead the ACF 46' disposed between the transparent conductive film 41' and the first heater electrode 42' to the first concave-shaped portions 42A' and the second concave-shaped portions 42B'. Accordingly, it is possible to surely prevent the first heater electrode 42' and the first heater flexible substrate 44' from coming off the transparent conductive film 41' by directly leading the ACF 46' to the first concave-shaped portions 42A' and the second concave-shaped portions 42B' at a position near the first heater electrode 42'.

Further, there is no need to perform a pressure bonding with respect to the first heater electrode 42' on the surface 5A of the substrate 5, it is possible to easily install a polarizing plate 55 at a larger area of the surface 5A of the substrate 5.

The liquid crystal panel 2' is manufactured and the transparent conductive film 41' is formed on the substrate 60. Then, the liquid crystal panel 2' and the transparent conductive film 41' on the substrate 60 are combined, and thus the liquid crystal device 1' is manufactured. Accordingly, it is possible to easily manufacture the liquid crystal device 1'.

In the above-described modification, the transparent conductive film 41' is formed on the surface of the substrate 60, which is on the substrate 5 side. However, the transparent conductive film 41' may be formed on the surface of the substrate 60, which is on the opposite side of the substrate 5.

Second Modification

Hereinafter, a liquid crystal device according to a second modification will be described.

Figure 11:
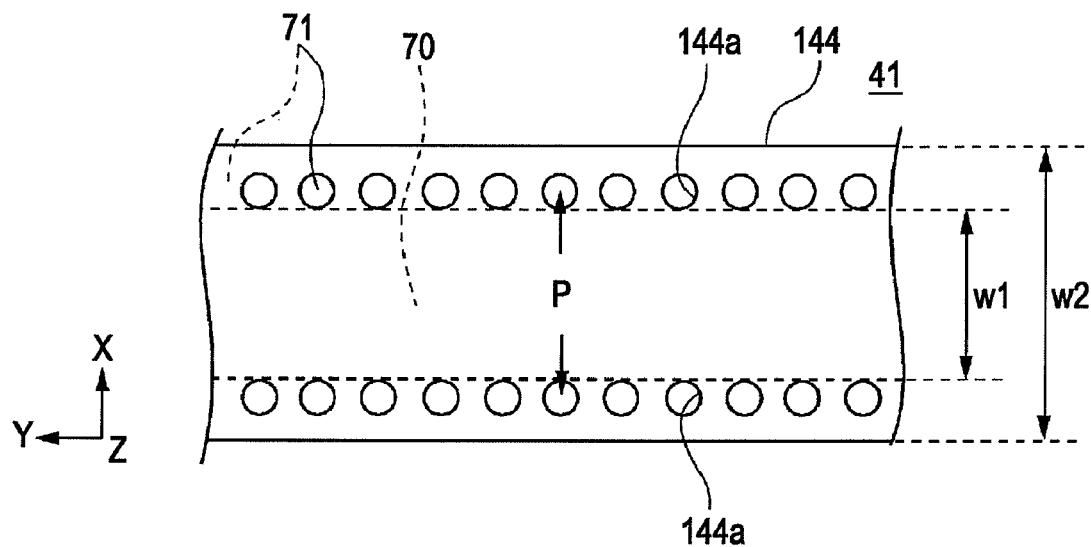
FIG. 11 is a partial plan view illustrating a heater electrode of a liquid crystal device according to a second modification.

FIG. 11 is a partial plan view illustrating a heater electrode of the liquid crystal device according to the second modification.

This modification is different from the structure shown in FIG. 6 in positions of the through-holes 44a provided to the first heater flexible substrate 44. The positions of the through-holes 45a provided to the second heater flexible substrate 45 are arranged in the same manner as the through-holes 44a. Accordingly, description of the positions of the through-holes 45a will be omitted.

In this modification, as shown in FIG. 11, a first heater flexible substrate 144 provided with through-holes 144a is used instead of the first heater flexible substrate 44 provided with through-holes 44a.

As shown in FIG. 11, the first heater flexible substrate 144 is provided with a plurality of through-holes 144a. As shown in FIG. 11, the through-holes 144a are disposed so as to be adjacent to the outer side of the outer edge of the first heater electrode 70 in a plan view. As shown in FIG. 11, the ACF 71 is introduced into the through-holes 144a.

According to this modification, the through-holes 144a are disposed so as to be adjacent to the outer side of the outer edge of the first heater electrode 70. Accordingly, when pressing and bonding the first heater electrode 70 against and to a transparent conductive film 41 with the ACF 71 interposed therebetween, it is possible to cause the ACF 71 disposed between the transparent conductive film 41 and the first heater electrode 70 to rapidly flow into the through-holes 144a in a direction indicated by the arrow P. Accordingly, it is possible to rapidly lead the ACF 71 to the through-holes 144a at a position near the first heater electrode 70. Thus, it is possible to surely prevent the first heater electrode 70 and the first heater flexible substrate 144 from coming off the transparent conductive film 41.

Third Modification

Hereinafter, a liquid crystal device according to a third modification will be described.

Figure 12:
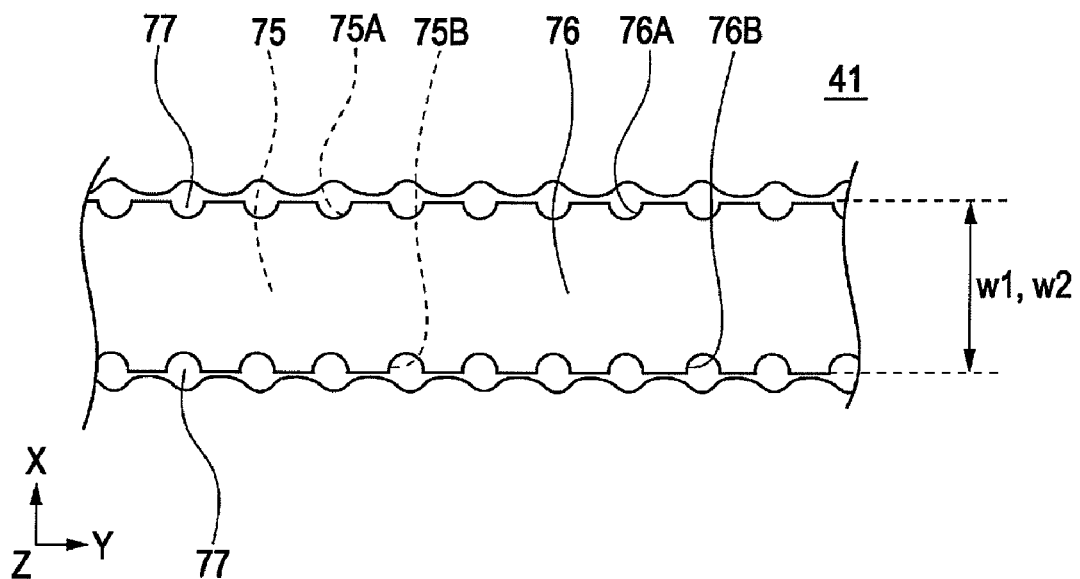
FIG. 12 is a partial plan view illustrating a heater electrode of a liquid crystal device according to a third modification.

FIG. 12 is a partial plan view illustrating the liquid crystal device according to the third modification.

The third modification is different from the liquid crystal device 1' according to the first modification in the shapes of the first and second concave-shaped portions 42A' and 42B' of the first heater electrode 42' and the third and fourth concave-shaped portions 44A' and 44B' of the first hater flexible substrate 44.

In this modification, a first heater electrode 75 is used instead of the first heater electrode 42'. Further, a first heater flexible substrate 76 is used instead of the first heater flexible substrate 44.

As shown in FIG. 12, the first heater electrode 75 has a rectangular shape having the first width w1, in the longitudinal direction (X direction in FIG. 12) of the liquid crystal panel 2 and has a plurality of first concave-shaped portions 75A arranged in the widthwise direction (Y direction in FIG. 12) of the liquid crystal panel 2 and a plurality of second concave-shaped portions 75B arranged in the widthwise direction (Y direction in FIG. 12) of the liquid crystal panel 2.

As shown in FIG. 12, the first concave-shaped portions 75A are depressed in a semicircular form in the longitudinal direction (X direction in FIG. 12) so as to go farther apart from a center portion of the liquid crystal panel 2. As shown in FIG. 12, the second concave-shaped portions 75B are depressed in a semicircular form in the longitudinal direction (X direction in FIG. 12) so as to approach the center portion of the liquid crystal panel 2.

The first heater flexible substrate 76 is disposed so as to overlap the first heater electrode 75 in a plan view. For example, the first heater flexible substrate 76 has almost the same shape as the first heater electrode 75 and has a plurality of third concave-shaped portions 76A arranged in the widthwise direction (Y direction in FIG. 12) of the liquid crystal panel 2 and a plurality of fourth concave-shaped portions 76B arranged in the widthwise direction (Y direction in FIG. 12) of the liquid crystal panel 2.

As shown in FIG. 12, the third concave-shaped portions 76A are depressed in a semicircular form in the longitudinal direction (X direction in FIG. 12) so as to go farther apart from the center portion of the liquid crystal panel 2. As shown in FIG. 12, the fourth concave-shaped portions 76B are depressed in a semicircular form in the longitudinal direction (X direction in FIG. 12) so as to approach the center portion of the liquid crystal panel 2.

The first concave-shaped portions 75A and the third concave-shaped portions 76A are formed by punch processing in a lump manner and the second concave-shaped portions 75B and the fourth concave-shaped portions 76B are formed by punch processing in a lump manner.

According to this modification, the first concave-shaped portions 75A and the second concave-shaped portions 76B are formed by punching processing in a lump manner, and the second concave-shaped portions 75B and the fourth concave-shaped portions 76B are formed by punching processing in a lump manner. Accordingly, it is possible to form the first concave-shaped portions 75A and the third concave-shaped portions 76A each having a semicircular form by punching processing in a lump manner and thus it is possible to reduce the manufacturing cost.

When performing a pressure bonding process, ACF 77 is flown out and introduced into the third concave-shaped portions 76A and the fourth concave-shaped portions 76B provided to the first heater flexible substrate 76. Accordingly, it is possible to securely bonding the first heater electrode 75 to the transparent conductive film 41 by pressing a small pressing area of the first heater electrode 75 with high pressure.

Fourth Modification

Hereinafter, a liquid crystal device according to a fourth modification will be described.

Figure 13:
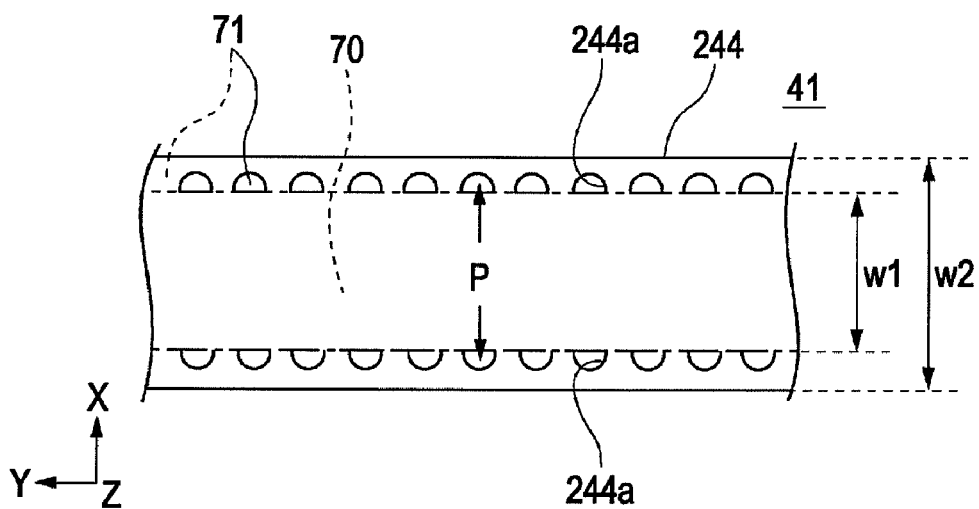
FIG. 13 is a partial plan view illustrating a heater electrode of a liquid crystal device according to a fourth modification.

FIG. 13 is a partial plan view illustrating a heater electrode of the liquid crystal device according to the fourth modification.

The liquid crystal device according to the fourth modification is different from the liquid crystal device shown in FIG. 6 in positions of the through-holes 44a provided to the first heater flexible substrate 44. Positions of through-holes 45a provided to a second heater flexible substrate 45 are arranged in the same manner as the through-holes 44a. Accordingly, description of the positions of the through-holes 45a will be omitted.

In this modification, a first heater flexible substrate 244 provided with through-holes 244a is used instead of the first heater flexible substrate 22 provided with the through-holes 44a according to the second modification.

As shown in FIG. 13, the first heater flexible substrate 244 is provided with a plurality of through-holes 244a. As shown in FIG. 13, the through-holes 244a are disposed so as to be adjacent to the outer side of the outer edge of first heater electrode 70 in a plan view. The through-holes 244a have a semicircular shape. As shown in FIG. 13, ACF 71 is introduced into the through-holes 244a.

The through-holes 244a having a semicircular shape can be formed by an etching process using the first heater electrode 70 as an etching mask.

According to this modification, the through-holes 244a are disposed so as to be adjacent to the outer side of the outer edge of the first heater electrode 70 in a plan view. Accordingly, when pressing and bonding the first heater electrode 70 against and to the transparent conductive film 41 with the ACF 71 interposed therebetween, it is possible to rapidly lead the ACF 71 disposed between the transparent conductive film 41 and the first heater electrode 70 so as to flow into the through-holes 244a in a direction indicated by the arrow P. Thus, it is possible to surely prevent the first heater electrode 70 and the first heater flexible substrate 244 from coming off the transparent conductive film.

Thus, it is possible to increase the contact area between the ACF 71 introduced into the through-holes 244a and the first heater flexible substrate 244. Accordingly, it is possible to enhance adhesion of the transparent conductive film 41 with respect to the first heater flexible substrate 244 and the first heater 70.

In this modification, the semicircular-shaped through-holes 244a provided to the first heater flexible substrate 244 may be formed in a circular shape, and the concave-portions of the first heater electrode 70 overlap halves of the circumferential edges of the circumferential edges of the through-holes. With such a structure, when performing a pressure bonding process with respect to the first heater flexible substrate 244, it is possible to more effectively cause the ACF to be flown out through the circular-shaped through-holes, and thus it is possible to enhance adhesion of the first heater electrode 70.

Fifth Modification

Hereinafter, a liquid crystal device according to a fifth embodiment of the invention will be described.

Figure 14:
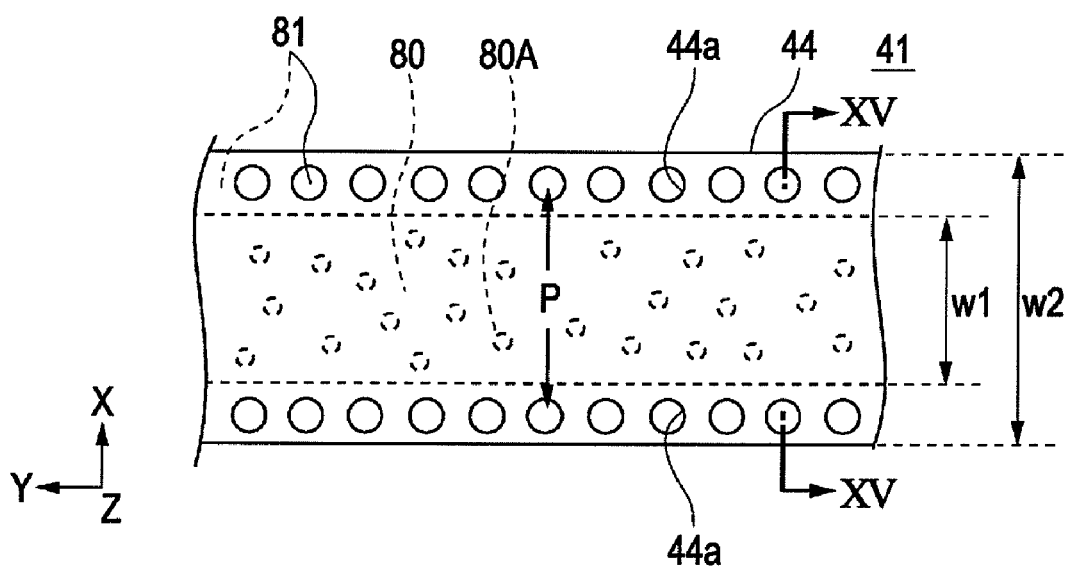
FIG. 14 is a partial plan view illustrating a heater electrode of a liquid crystal device according to a fifth modification.
Figure 15:
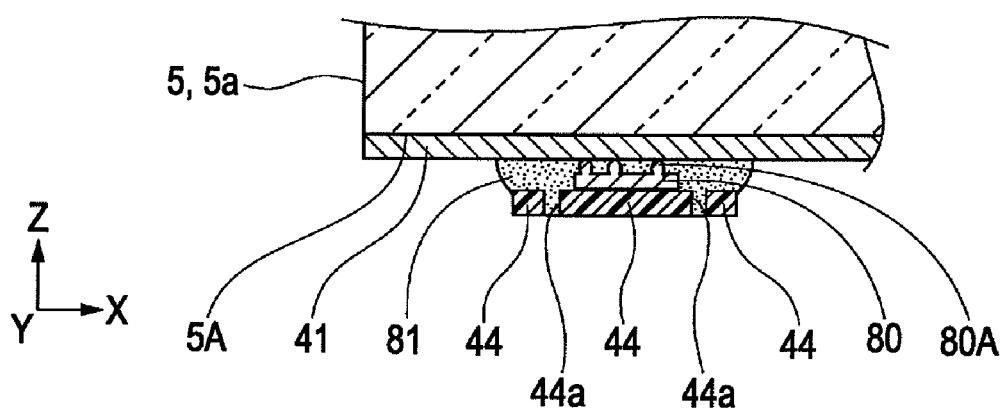
FIG. 15 is a sectional view taken along line XV-XV shown in FIG. 14.

FIG. 14 is a partial plan view illustrating a heater electrode of the liquid crystal device according to the fifth modification. FIG. 15 is a sectional view taken along line XV-XV in FIG. 14 for illustrating the liquid crystal device.

The liquid crystal device according to this modification is different from the liquid crystal device shown in FIG. 6 in that the liquid crystal device according to the fifth modification uses a first heater electrode 80 shown in FIG. 14 and a non conductive film (NCF) 81 shown in FIG. 15 instead of the first heater electrode 70 having a rectangular shape shown in FIG. 6 and the ACF 61 shown in FIG. 6.

The first heater electrode 80 has a rectangular shape and includes a plurality of protrusions 80A protruding toward the transparent conductive film 41 so as to be in contact with a transparent conductive film 41. The first heater electrode 80 is in contact with the transparent conductive film 41 via the plurality of protrusions 80A.

The NCF 81 is an adhesive containing conductive particles as in the ACF.

The NCF 81 is disposed between the first heater flexible substrate 44 and the transparent conductive film 41 so as to have at least the second width w2. The NCF 81 is flown out from between the first heater flexible substrate 44 and the transparent conductive film 41 and is introduced into the through-holes 44a.

According to this modification, the first heater electrode 80 includes the plurality of protrusions 80A protruding toward the transparent conductive film 41 so as to be in contact with the transparent conductive film 41. Accordingly, by the use of the NCF 81 as the adhesive, it is possible to achieve the electrical connection between the first heater electrode 80 and the transparent conductive film 41 via the plurality of protrusions 81A of the first heater elect rode 80. The NCF 81 is disposed between the first heater flexible substrate 44 and the transparent conductive film 41 so as to have at least the second width w2, and is flown into the through-holes 44a. Accordingly, it is possible to increase the contact area between the NCF 81 and the first heater flexible substrate 44 and to enhance adhesion between the first heater flexible substrate 44 and the transparent conductive film 41.

Second Embodiment-Electronic Apparatus

Hereinafter, an electronic apparatus including the liquid crystal device 1 will be described.

Figure 16:
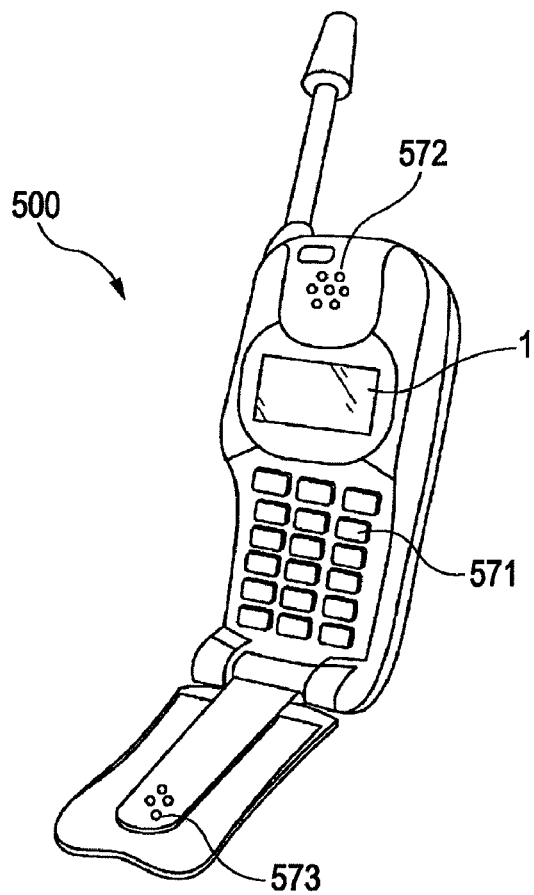
FIG. 16 is a schematic perspective view illustrating appearance of a cellular phone according to the invention.
Figure 17:
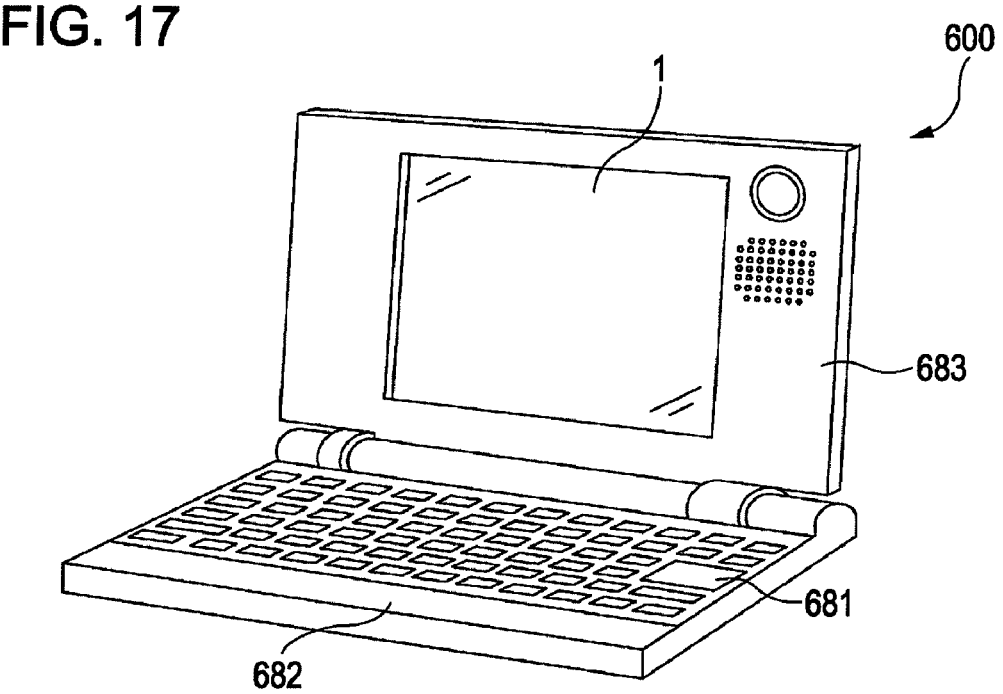
FIG. 17 is a schematic perspective view illustrating appearance of a personal computer.

FIG. 16 is a perspective view illustrating a cellular phone according to a second embodiment of the invention and FIG. 17 is a perspective view illustrating a personal computer.

As shown in FIG. 6, the cellular 500 includes an exterior frame having a plurality of manipulation buttons 571, an ear piece 572, and a mouth piece 573, and the liquid crystal device 1.

As shown in FIG. 1, the personal computer 600 includes a body portion 682 provided with a keyboard 681, and a liquid crystal display unit 683. The liquid crystal display unit 683 has the liquid crystal device 1 provided to the exterior frame.

In addition to the liquid crystal device 1, the electronic apparatus include a display signal producing unit (not shown) including a display information output source, a variety of circuits such as a display information processing circuit, and a power source circuit for supplying power to the circuits.

Further, in the case in which the electronic apparatus is the personal computer 600, a display image is displayed on the liquid crystal device 1 through a process in which a display signal is produced by the display signal producing unit on the basis of information input from the keyboard 681 and is supplied to the liquid crystal device.

According to the invention, by the utilization of the liquid crystal device 1 which is excellent in adhesion and the reliability of electrical connection between the transparent conductive film 41 and the first heater electrode 42, it is possible to realize the electronic apparatus having high-grade display quality.

In addition to the electronic apparatuses described above, examples of the electronic apparatus include a touch panel on which the liquid crystal device is mounted, a projector, a liquid crystal television set, a view finder type video recorder, a monitor direct viewing type video recorder, a car navigation system, a pager, an electronic organizer, and a calculator. Accordingly, the liquid crystal device 1 is applicable to a display unit of such electronic apparatuses.

The invention is not limited to any of the above-described embodiments but various modifications and variations may be made within the scope of the technical spirit of the invention. Further, the embodiments may be properly combined without departing from the spirit or scope of the invention.

In the above-described embodiments, the thin film transistor element active matrix type liquid crystal device is exemplified as the liquid crystal device, but the electro-optical device is not limited thereto. For example, the liquid crystal device may be a thin film diode element active matrix type liquid crystal device or a passive matrix type liquid crystal device.

In the above-described embodiments, the through-holes 44a has a semicircular shape or a circular shape but the shape of the through-holes 44*a* is not limited thereto. For example, the through-holes 44*a* may have a polygonal shape or a slit shape.

In this embodiment, the first heater electrode 42 includes the first concave-shaped portions 42A and the second concave-shaped portions 42B on the center side and the opposite side, respectively. However, the invention is not limited thereto. For example, the first heater electrode 42 may include the second concave-shaped portions 42B but may not include the first concave-shaped portions 42A. With such a structure, it is possible to surely decrease the amount of ACF 46 which is running off at a center portion of the liquid crystal panel 2, and thus it is possible to precisely place the polarizing plate.

In the above embodiments, the concave-shaped portions or the though-holes provided to the heater flexible substrate are formed along each of paired sides of the heater flexible substrate. However, the invention is not limited thereto but the concave-shaped portions or the through-holes can be formed along either one side of the paired sides.

The entire disclosure of Japanese Patent Application Nos. 2007-070209, field Mar. 19, 2007 and 2008-039743, field Feb. 21, 2008 are expressly incorporated by reference herein.

What is claimed is:

1. An electro-optical device comprising:
    an electro-optical panel including a first substrate and a second substrate which interpose an electro-optical material therebetween;
    a transparent conductive film disposed on an outer surface of the first substrate or the second substrate; and
    a base member having an electrode electrically connected to the transparent conductive film via an adhesive,
    wherein the electrode is formed at a region having a plane shape, which is the same as or narrower than that of the base member, the base member is provided with concave portions or through-holes disposed along a side thereof, and the concave portions or the through-holes of the base member are provided with the adhesive.

2. The electro-optical device according to claim 1, wherein the electrode has a concave portion at an outer edge thereof, and the concave portion of the electrode is filled with the adhesive.

3. The electro-optical device according to claim 1, wherein the side surface of the electrode is coated with the adhesive.

4. The electro-optical device according to claim 1, wherein the through-hole is formed at a position where the through-hole does not overlap the electrode.

5. The electro-optical device according to claim 2, wherein the concave portion of the electrode overlaps the concave portion of the base member in a plan view.

6. The electro-optical device according to claim 2, wherein the through-hole of the base member is formed to extend in a direction directing toward an opening of the concave portion of the electrode.

7. The electro-optical device according to claim 1, wherein the adhesive is an anisotropic conductive film.

8. An electronic apparatus comprising the electro-optical device according to claim 1.

* * * * *